US012652497B2

(12) United States Patent
Fu et al.

(10) Patent No.: US 12,652,497 B2
(45) Date of Patent: Jun. 9, 2026

(54) BONE CONDUCTION SPEAKERS

(71) Applicant: SHENZHEN SHOKZ CO., LTD., Guangdong (CN)

(72) Inventors: Junjiang Fu, Shenzhen (CN); Fengyun Liao, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 525 days.

(21) Appl. No.: 18/183,926

(22) Filed: Mar. 14, 2023

(65) Prior Publication Data

US 2023/0217155 A1 Jul. 6, 2023

Related U.S. Application Data

(63) Continuation of application No. PCT/CN2021/071875, filed on Jan. 14, 2021.

(51) Int. Cl.
*H04R 9/06* (2006.01)
*G10K 11/172* (2006.01)
(Continued)

(52) U.S. Cl.
CPC ............ *H04R 9/06* (2013.01); *G10K 11/172* (2013.01); *H04R 1/1066* (2013.01);
(Continued)

(58) Field of Classification Search
CPC ...... H04R 9/06; H04R 1/1066; H04R 1/1075; H04R 1/2803; H04R 1/283; H04R 9/025; H04R 2460/13; G10K 11/172
(Continued)

(56) References Cited

U.S. PATENT DOCUMENTS 11,765,529 B2 * 9/2023 Nyström .............. H04R 25/554 381/151
11,778,385 B2 * 10/2023 Bergs ................. G01N 29/2412 381/326

(Continued)

FOREIGN PATENT DOCUMENTS

CA 3103583 A1 12/2019
CN 101365256 A 2/2009

(Continued)

OTHER PUBLICATIONS

The Extended European Search Report in European Application No. 21918433.0 mailed on Oct. 10, 2023, 11 pages.

(Continued)

*Primary Examiner* — Sean H Nguyen
(74) *Attorney, Agent, or Firm* — METIS IP LLC

(57) ABSTRACT

The present disclosure provides a bone conduction speaker, comprising: a vibration assembly, the vibration assembly including a vibration element and a vibration housing, the vibration element being used to convert an electrical signal into a mechanical vibration, the vibration housing being used to contact with a face of a user and to transmit the mechanical vibration to the user in a bone conduction manner to produce a sound; and a resonance assembly including a first elastic element and a mass element, the mass element being connected to the vibration assembly by the first elastic element, wherein the vibration assembly causes the resonance assembly to vibrate, the vibration of the resonance assembly weakening a vibration amplitude of the vibration housing.

19 Claims, 11 Drawing Sheets

(51) Int. Cl.
*H04R 1/10* (2026.01)
*H04R 1/28* (2006.01)
*H04R 9/02* (2006.01)

(52) U.S. Cl.
CPC ......... *H04R 1/1075* (2013.01); *H04R 1/2803* (2013.01); *H04R 1/283* (2013.01); *H04R 9/025* (2013.01); *H04R 2460/13* (2013.01)

(58) Field of Classification Search
USPC .......................................................... 381/151
See application file for complete search history.

(56) References Cited

U.S. PATENT DOCUMENTS

| | | | |
|---|---|---|---|
| 2003/0012395 | A1 | 1/2003 | Fukuda |
| 2010/0054501 | A1 | 3/2010 | Choi |
| 2014/0185822 | A1 | 7/2014 | Kunimoto et al. |
| 2015/0030188 | A1 | 1/2015 | Nabata et al. |
| 2017/0111728 | A1 | 4/2017 | Kim et al. |
| 2018/0035219 | A1 | 2/2018 | Gustafsson |
| 2018/0255401 | A1 | 9/2018 | Asfaw et al. |
| 2019/0014425 | A1 | 1/2019 | Liao et al. |
| 2019/0057680 | A1 | 2/2019 | Morozov |
| 2019/0082266 | A1 | 3/2019 | Qi et al. |
| 2019/0253781 | A1 | 8/2019 | Kunimoto et al. |
| 2020/0213780 | A1 | 7/2020 | Qi et al. |
| 2020/0296526 | A1 | 9/2020 | Kim et al. |
| 2020/0336824 | A1 | 10/2020 | Zheng et al. |
| 2021/0092525 | A1 | 3/2021 | Zheng et al. |
| 2023/0217155 | A1 | 7/2023 | Fu et al. |

FOREIGN PATENT DOCUMENTS

| | | | |
|---|---|---|---|
| CN | 101479499 | B | 12/2011 |
| CN | 105101019 | A | 11/2015 |
| CN | 105101020 | A | 11/2015 |
| CN | 204741559 | U | 11/2015 |
| CN | 204929243 | U | 12/2015 |
| CN | 205454090 | U | 8/2016 |
| CN | 106210994 | A | 12/2016 |
| CN | 106954154 | | 7/2017 |
| CN | 107889036 | A | 4/2018 |
| CN | 108243377 | A | 7/2018 |
| CN | 108566600 | A | 9/2018 |
| CN | 108632726 | A | 10/2018 |
| CN | 207995381 | U | 10/2018 |
| CN | 109121038 | | 1/2019 |
| CN | 208434106 | U | 1/2019 |
| CN | 106658309 | B | 8/2019 |
| CN | 210868165 | U | 6/2020 |
| CN | 114765715 | A | 7/2022 |
| EP | 3337185 | A1 | 6/2018 |
| EP | 3606089 | A1 | 2/2020 |
| JP | 2004080198 | A | 3/2004 |
| JP | 2005151183 | A | 6/2005 |
| JP | 2011188462 | A | 9/2011 |
| JP | 2017183859 | A | 10/2017 |
| JP | 2018186572 | | 11/2018 |
| JP | 2019020533 | A | 2/2019 |
| KR | 20080036413 | A | 4/2008 |
| KR | 20080070468 | A | 7/2008 |
| KR | 20090082999 | A | 8/2009 |
| KR | 20120014294 | A | 2/2012 |
| KR | 101419491 | B1 | 7/2014 |
| WO | 2014017026 | A1 | 1/2014 |
| WO | 2019003465 | A1 | 1/2019 |

OTHER PUBLICATIONS

Notice of Reasons for Rejection in Japanese Application No. 2023527770 mailed on Jun. 10, 2024, 8 pages.
International Search Report in PCT/CN2021/071875 mailed on Oct. 20, 2021, 7 pages.
Notice of Preliminary rejection in Korean Application No. 10-2023-7015327 mailed on Jun. 10, 2025, 14 pages.
First Office Action in Chinese Application No. 202180069746.6 mailed on Jul. 18, 2025, 21 pages.
First Office Action in Chinese Application No. 202111234604.9 mailed on Apr. 13, 2023, 13 pages.
Song, Zhuoyue et al., Design and Implementation of Portable Bone Conduction Hearing Aid, Modern Information Technology, 5(1): 31-34&39, 2021.
Office Action in Russian Application No. 2023103339 mailed on Jun. 15, 2023, 18 pages.
International Search Report in PCT/CN2021/125855 mailed on Jan. 19, 2022, 7 pages.
Written Opinion in PCT/CN2021/125855 mailed on Jan. 19, 2022, 5 pages.
Decision to Grant a Patent in Japanese Application No. 2023-518840 mailed on Feb. 4, 2025, 6 pages.

* cited by examiner

BONE CONDUCTION SPEAKERS

CROSS REFERENCE TO RELATED APPLICATIONS

This application is a Continuation of International Patent Application No. PCT/CN2021/071875, filed on Jan. 14, 2021, the entire contents of each of which are hereby incorporated by references.

TECHNICAL FIELD

The present disclosure relates to the field of bone conduction speakers, and in particular, to a bone conduction speaker capable of improving low frequency vibration.

BACKGROUND

A bone conduction speaker converts a sound signal into a mechanical vibration signal. The mechanical vibration signal is transmitted to the human auditory nerve through human tissue and bone so that a wearer can hear the sound. After widening a frequency response range of the bone conduction speaker, especially a low frequency response range, the amplitude of the low frequency resonance peak of the bone conduction speaker becomes large. This results in a stronger sense of the vibration generated by the bone conduction speaker affecting the user's experience. In addition, the large resonance peak value reduces the sound quality.

The present disclosure provides a bone conduction speaker that not only significantly reduces the vibration sense of the bone conduction speaker at the low frequency resonance peak, but also improves the sound quality of the bone conduction speaker.

SUMMARY

It is an objective of the present disclosure to provide a bone conduction speaker with the purpose of reducing an amplitude of a low frequency resonance peak of the bone conduction speaker to achieve a reduced vibration sense of the bone conduction speaker and to improve its sound quality.

In order to achieve the purpose, the present disclosure provides the following technical solutions.

A bone conduction speaker may include: a vibration assembly, the vibration assembly including a vibration element and a vibration housing, the vibration element being used to convert an electrical signal into a mechanical vibration, the vibration housing being used to contact with a face of a user and to transmit the mechanical vibration to the user in a bone conduction manner to produce a sound; and a resonance assembly, the resonance assembly including a first elastic element and a mass element, the mass element being connected to the vibration assembly by the first elastic element, wherein the vibration assembly causes the resonance assembly to vibrate, the vibration of the resonance assembly weakening a vibration amplitude of the vibration housing.

In some embodiments, a ratio of a mass of the mass element to a mass of the vibration housing is in a range from 0.04~1.25.

In some embodiments, the ratio of the mass of the mass element to the mass of the vibration housing is in a range from 0.1~0.6.

In some embodiments, the vibration assembly generates a first low frequency resonance peak at a first frequency and the resonance assembly generates a second low frequency resonance peak at a second frequency, a ratio of the second frequency to the first frequency being in a range from 0.5~2.

In some embodiment, the vibration assembly generates the first low frequency resonance peak at the first frequency and the resonance assembly generates the second low frequency resonance peak at the second frequency, the ratio of the second frequency to the first frequency being in a range from 0.9~1.1.

In some embodiments, the first frequency and the second frequency are both less than 500 Hz.

In some embodiments, a vibration amplitude of the resonance assembly is greater than the vibration amplitude of the vibration housing in a frequency range less than the first frequency.

In some embodiments, the vibration assembly further includes a second elastic element, wherein the vibration housing accommodates the vibration element and the second elastic element, the vibration element transmitting the mechanical vibration to the vibration housing through the second elastic element.

In some embodiments, the second elastic element is a transducer, the transducer being fixedly connected to the vibration housing.

In some embodiments, the first elastic element is fixedly connected to the vibration housing, the vibration housing transmitting the mechanical vibration to the mass element through the first elastic element.

In some embodiments, the resonance assembly is accommodated within the vibration housing, the resonance assembly being connected to an inner wall of the vibration housing through the first elastic element.

In some embodiments, the first elastic element includes a diaphragm, and the mass element includes a composite structure affixed to a surface of the diaphragm.

In some embodiments, the composite structure includes a paper cone, an aluminum sheet or a copper sheet.

In some embodiments, the vibration housing is disposed with at least one sound outlet hole, and a sound generated by the vibration of the resonance assembly is exported to an external world through the at least one sound outlet hole.

In some embodiments, the at least one sound outlet hole is disposed on a side of the vibration housing back towards the face of the user.

In some embodiments, the bone conduction speaker further includes a fixation assembly, the fixation assembly being used to maintain a stable contact of the bone conduction speaker with the user, the fixation assembly being fixedly connected to the vibration housing.

In some embodiments, the resonance assembly is disposed outside of the vibration housing, the resonance assembly being connected to an outer wall of the vibration housing through the first elastic element.

In some embodiments, the mass element is a recess member, the vibration housing is at least partially accommodated within the recess member, the first elastic element is connected to the outer wall of the vibration housing and to an inner wall of the recess member, and an acoustic channel is formed between the inner wall of the recess member and the outer wall of the vibration housing.

In some embodiments, the bone conduction speaker further includes a fixation assembly, the fixation assembly being used to maintain a contact of the bone conduction speaker with the face of the user, the fixation assembly being fixedly connected to the resonance assembly.

BRIEF DESCRIPTION OF THE DRAWINGS

The present disclosure will be further described by way of exemplary embodiments, which will be described in detail by way of the accompanying drawings. These embodiments are not limiting, and in these embodiments the same numbering indicates similar structures wherein.

DETAILED DESCRIPTION

Figure 1:
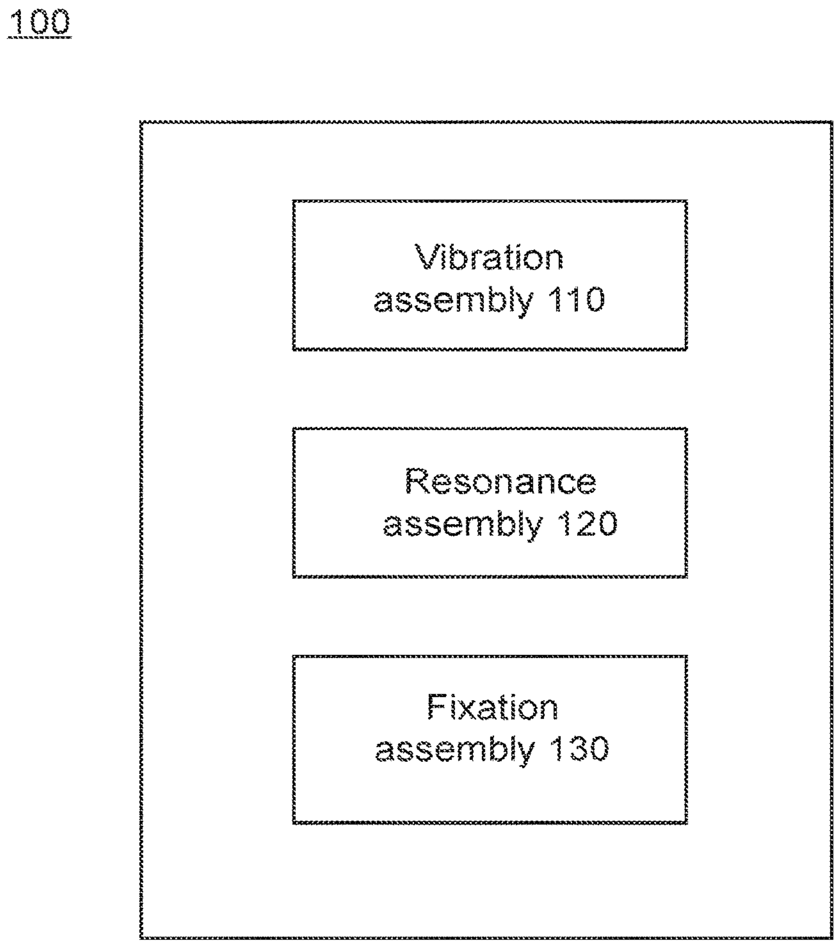
FIG. 1 is a module diagram illustrating a bone conduction speaker according to some embodiments of the present disclosure.

The technical schemes of the present disclosure embodiments will be more clearly described below, and the accompanying drawings need to be configured in the description of the embodiments will be briefly described below. Obviously, the drawings in the following description are merely some examples or embodiments of the present disclosure, and will be applied to other similar scenarios according to these accompanying drawings without paying creative labor. Unless obviously obtained from the context or the context illustrates otherwise, the same numeral in the drawings refers to the same structure or operation.

As shown in the present disclosure and claims, unless the context clearly suggests an exception, the words “one”, “a”, “an” and/or “the” are not specific to the singular form, but may also include the plural form. In general, the terms “includes” and “comprises” suggest only the inclusion of clearly identified steps and elements that do not constitute an exclusive list, and the method or apparatus may also contain other steps or elements. The term “based on” is “based, at least in part, on”. The term “an embodiment” means “at least one embodiment”, the term “another embodiment” means “at least one additional embodiment”. Definitions of other terms will be given in the description below. In the following, without loss of generality, the description of “bone conduction speaker” or “bone conduction headset” will be used when describing the bone conduction related technology in the present disclosure. This description is only a form of bone conduction applications, for the ordinary skilled person in the field, “speaker” or “headset” can also be replaced by other similar words, such as “player”, “hearing aid”, etc. In fact, the various implementations of the invention can be easily applied to other non-speaker-based hearing devices. For example, for professionals in the field, after understanding the basic principle of the bone conduction speaker, it is possible to make various modifications and changes in the form and details of the specific ways and steps of implementing the bone conduction speaker without departing from this principle, in particular, adding the function of environmental sound pickup and processing to the bone conduction speaker so that the speaker can realize the function of a hearing aid. For example, a sensor, e.g., a microphone can pick up the sound of the user/wearer’s surroundings and, under a certain algorithm, transmit the sound processed (or the electrical signal generated) to the bone conduction speaker. That is, the bone conduction speaker can be modified in a certain way to include the function of picking up environmental sound and transmitting the sound to the user/wearer through the bone conduction speaker after certain signal processing, thereby realizing the function of a bone conduction hearing aid. By way of example, the algorithm described herein may include one or a combination of a noise cancellation, an auto gain control, an acoustic feedback suppression, a wide dynamic range compression, an active environment identification, an active anti-noise, a directional processing, a tinnitus processing, a multi-channel wide dynamic range compression, an active whistle suppression, a volume control, etc.

FIG. 1 is a module diagram illustrating a bone conduction speaker according to some embodiments of the present disclosure. As shown in FIG. 1, the bone conduction speaker 100 may include a vibration assembly 110, a resonance assembly 120, and a fixation assembly 130.

The vibration assembly 110 may generate a mechanical vibration. The generation of the mechanical vibration is accompanied by a conversion of energy, and the bone conduction speaker 100 may use the vibration assembly 110 to achieve a conversion of a signal containing sound information to the mechanical vibration. The conversion process may involve a coexistence and conversion of many different types of energy. For example, the electrical signal through a transducer in the vibration assembly 110 may be directly converted to the mechanical vibration to produce a sound. For example, the sound information may be contained in a light signal, and a particular transducer device may implement the process of converting the light signal to a vibration signal. Other types of energy that may coexist and be converted during the operation of the transducer include a thermal energy, a magnetic energy, etc. Energy conversion methods of the transducer device may include a moving coil, an electrostatic, a piezoelectric, a moving iron, a pneumatic, an electromagnetic, etc. In some embodiments, the vibration assembly 110 may include a vibration housing and a vibration element.

At least a portion of the vibration housing may be in contact with a human face to transmit the mechanical vibration to bones of the human face to enable the human body to hear the sound. The vibration housing may form an enclosed or non-enclosed accommodating space, and the vibration element may be disposed inside the vibration housing. In some embodiments, the vibration housing may also not form an accommodating space, but be directly connected to the vibration element. In some embodiments, the vibration housing may be directly or indirectly connected to the vibration element, and the mechanical vibration of the vibration element is transmitted to an auditory nerve via the bones, so that the human body hears the sound.

In some embodiments, the vibration element (i.e., the transducer device) may include a magnetic circuit assembly. The magnetic circuit assembly may provide a magnetic field. The magnetic field may be used to convert a signal containing sound information into a mechanical vibration signal. In some embodiments, the sound information may include a video, an audio file having a particular data format, or data or files that can be converted to a sound by a particular means. The signal containing the sound information may come from a storage assembly of the bone conduction speaker 100 itself, or from an information generation system, a storage system or a delivery system other than the bone conduction speaker 100. The signal containing the sound information may include one or more combinations of an electrical signal, an optical signal, a magnetic signal, a mechanical signal, etc. The signal containing the sound information may come from one source or multiple signals. The multiple signal sources may or may not be related. In some embodiments, the bone conduction speaker 100 may obtain the signal containing the sound information in a variety of different ways, e.g., the obtaining of the signal may be wired or wireless, and may be real-time or time-delayed. For example, the bone conduction speaker 100 may receive an electrical signal containing sound information by wired or wireless means, or it may obtain data directly from a storage medium to generate a sound signal. As another example, the bone conduction speaker 100 may include an assembly with a sound pickup function that converts the mechanical vibration of the sound into the electrical signal by picking up the sound in the environment, which is processed by an amplifier to obtain an electrical signal that meets specific requirements. In some embodiments, the wired connection may include one or a combination of a metallic cable, an optical cable, or a hybrid metallic and optical cable, such as, for example, a coaxial cable, a communication cable, a flexible cable, a spiral cable, a non-metallic sheathed cable, a metal sheathed cable, a multi-core cable, a twisted pair cable, a ribbon cable, a shielded cable, a telecommunication cable, a double stranded cable, a parallel two-core conductor, a twisted pair cable, etc. The examples described above are for convenience of illustration only. The medium of the wired connection may also be of other types, for example, other carriers for the transmission of the electrical or the optical signals, etc.

The wireless connection may include a radio communication, a free-space optical communication, an acoustic communication, and an electromagnetic induction, etc. The radio communication may include IEEE 802.11 series of standards, IEEE 802.15 series of standards (e.g., Bluetooth technology and cellular technology, etc.), a first generation mobile communication technology, a second generation mobile communication technology (e.g., FDMA, TDMA, SDMA, CDMA, and SSMA, etc.), a general packet radio service technology, a third generation mobile communication technology (e.g. CDMA2000, WCDMA, TD-SCDMA, and WiMAX, etc.), a fourth generation mobile communication technology (e.g., TD-LTE and FDD-LTE, etc.), a satellite communication (e.g., GPS technology, etc.), a near field communication (NFC), and other technologies operating in the ISM band (e.g., 2.4 GHz, etc.); the free-space optical communication may include a visible light, an infrared signal, etc.; the acoustic communication may include an acoustic wave, an ultrasonic signal, etc.; the electromagnetic induction may include a near-field communication technology, etc. The examples described above are for convenience of illustration only, and the medium for the wireless connection may also be of other types, e.g., a Z-wave technology, other tolled civilian radio bands, and military radio bands, etc. For example, as some application scenarios of the present disclosure, the bone conduction speaker 100 may obtain the signal containing the sound information from other devices via a Bluetooth™ technology.

The resonance assembly 120 is connected to the vibration assembly 110, and the vibration assembly 110 may transmit at least a portion of the mechanical vibration to the resonance assembly 120 when the vibration assembly 110 generates the mechanical vibration, causing the resonance assembly 120 to vibrate, thereby weakening a vibration amplitude of the vibration assembly 110. In some embodiments, the resonance assembly 120 may include a first elastic element and a mass element, and the mass element may be connected to the vibration assembly 110 through the first elastic element. The vibration assembly 110 may transmit the mechanical vibration to the mass element through the first elastic element, causing the mass element to vibrate.

The fixation assembly 130 may act as a fixed support for the vibration assembly 110 and the resonance assembly 120, thereby maintaining a stable contact between the bone conduction speaker 100 and the face of the user. The fixation assembly 130 may include one or more fixation connectors. In some embodiments, the fixation assembly 130 may be worn binaurally. For example, the fixed assembly 130 may be fixedly connected to two groups of the vibration assemblies 110 (or the resonance assemblies 120) at each end. When the user wears the bone conduction speaker 100, the fixation assembly 130 may hold two groups of the vibration assemblies 110 (or the resonance assemblies 120) near the user's left and right ears, respectively. In some embodiments, the fixation assembly 130 may also be worn monaurally. For example, the fixation assembly 130 may be fixedly connected to only one group of the vibration assembly 110 (or the resonance assembly 120). When the user wears the bone conduction speaker 100, the fixation assembly 130 may hold the vibration assembly 110 (or the resonance assembly 120) near the user's side of the ear. In some embodiments, the fixation assembly 130 may be any combination of one or more of glasses (e.g., sunglasses, augmented reality glasses, virtual reality glasses), a helmet, a hairband, without limitation herein.

The above description of the bone conduction speaker structure is only a specific example and should not be considered the only feasible embodiment. Obviously, it is possible for a skilled person in the art to make various amendments and changes in form and detail to the specific manner and steps for implementing the bone conduction speaker 100 without departing from the basic principles of the bone conduction speaker, but these amendments and changes remain within the scope of the above description. For example, the bone conduction speaker 100 may include one or more processors, and the processors may perform one or more sound signal processing algorithms. The sound signal processing algorithms may correct or enhance the sound signal. For example, the sound signal is subjected to a noise reduction, an acoustic feedback suppression, a wide dynamic range compression, an automatic gain control, an active environment recognition, an active anti-noise, a directional processing, a tinnitus processing, a multi-channel wide dynamic range compression, an active whistle suppression, a volume control, or other similar, or any combination of the above, and these corrections and changes remain within the scope of protection of the claims of the present disclosure. As another example, the bone conduction speaker 100 may include one or more sensors, such as a temperature sensor, a humidity sensor, a speed sensor, a displacement sensor, and so on. The sensors may pick up user information or environmental information.

Figure 2:
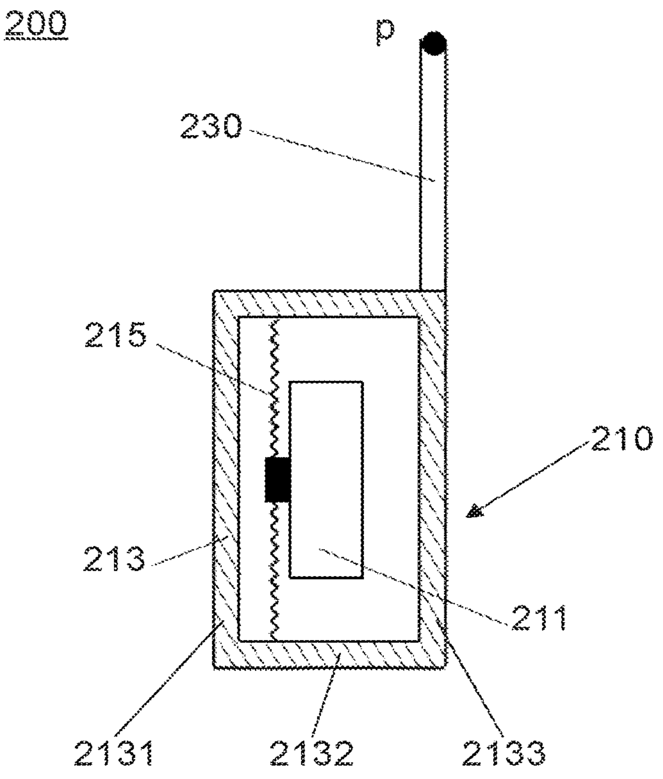
FIG. 2 is a schematic diagram illustrating a longitudinal cross-section of a bone conduction speaker without adding a resonance assembly according to some embodiments of the present disclosure.

FIG. 2 is a schematic diagram illustrating a longitudinal cross-section of a bone conduction speaker without adding a resonance assembly, according to some embodiments of the present disclosure. As shown in FIG. 2, in some embodiments, the bone conduction speaker 200 may include a vibration assembly 210 and a fixation assembly 230.

In some embodiments, the vibration assembly 210 may include a vibration element 211, a vibration housing 213, and a second elastic element 215 elastically connected to the vibration element 211 and the vibration housing 213. The vibration element 211 may convert an acoustic signal into a mechanical vibration signal and thereby generate a mechanical vibration. When the mechanical vibration of the vibration element 211 occurs, the vibration housing 213 may be driven to vibrate by the second elastic element 215. It should be noted that when the vibration element 211 transmits the mechanical vibration to the vibration housing 213 through the second elastic element 215, a vibration frequency of the vibration housing 213 is the same as a vibration frequency of the vibration element 211.

The vibration element 211 described in this present disclosure may refer to an element that converts an acoustic signal into a mechanical vibration signal, for example, a transducer. In some embodiments, the vibration element 211 may include a magnetic circuit assembly and a coil, the magnetic circuit assembly may be used to form a magnetic field in which the coil may undergo a mechanical vibration. Specifically, the coil may be fed with a signal current, and the coil is in the magnetic field formed by the magnetic circuit assembly and is subjected to an amperage force to receive a drive to generate the mechanical vibration. At the same time the magnetic circuit assembly is subjected to a reaction force opposite to that of the coil. Under the action of the amperage force, the vibration element 211 may generate the mechanical vibration. And the mechanical rotation of the vibration element 211 may be transmitted to the vibration housing 213, causing the vibration housing 213 to vibrate in response.

In some embodiments, the vibration housing 213 may include a housing panel 2131, a housing side panel 2132, and a housing back panel 2133. The housing panel 2131 refers to a side of the vibration housing 213 that is in contact with the face of the user when the user is wearing the bone conduction speaker 200. And the housing back panel 2133 is disposed on a side opposite the housing panel 2131. In some embodiments, the housing panel 2131 and the housing back panel 2133 are disposed on two end faces of the housing side panel 2132, respectively. The housing panel 2131, the housing side panel 2132, and the housing back panel 2133 may form a housing-like structure with a certain accommodating space. In some embodiments, the vibration element 211 may be disposed in an inner part of the housing-like structure.

In some embodiments, the housing panel 2131, the housing side panel 2132, and the housing back panel 2133 may be made of the same or different materials. For example, the housing panel 2131 and the housing side panel 2132 may be made from a same material, while the material used to make the housing back panel 2133 may be different from the first two. In some embodiments, the housing panel 2131, the housing side panel 2132, and the housing back panel 2133 may each be made of a different material.

In some embodiments, the material used to make the housing panel 2131 includes, but is not limited to, an acrylonitrile butadiene styrene (ABS) copolymer, a polystyrene (PS), a high impact polystyrene (HIPS), a polypropylene (PP), a polyethylene terephthalate (PET), a polyester (PES), a polycarbonate polystyrene (HIPS), a polypropylene (PP), a polyethylene terephthalate (PET), a polypropylene (PES), and a polyethylene terephthalate (PET), a Polyester (PES), a Polycarbonate (PC), a Polyamide (PA), a Polyvinyl chloride (PVC), a Polyurethane (PU), a Polyvinylidene chloride, a Polyethylene (PE), a Polymethyl methacrylate (PMMA), a Poly-ether-ether-ketone (PEEK), a Phenolics (PF), a urea-formaldehyde resin (UF), a melamine formaldehyde resin (MF), and some metals and alloys (such as Aluminum alloy, chromium-molybdenum steel, scandium alloy, magnesium alloy, titanium alloy, magnesium-lithium alloy, nickel alloy, etc.), glass fiber or carbon fiber, or a combination of any of these materials. In some embodiments, the material used to make the housing panel 2131 is any combination of a glass fiber, a carbon fiber and a material such as polycarbonate (PC), polyamides (PA), etc. In some embodiments, the material used to make the housing panel 2131 may be a mixture of the carbon fiber and the polycarbonate (PC) in a certain ratio. In some embodiments, the material used to make the housing panel 2131 may be a mixture of the carbon fiber, the glass fiber, and the polycarbonate (PC) in a certain ratio. In some embodiments, the material used to make the housing panel 2131 may be a mixture of the glass fiber and the polycarbonate (PC) in a certain ratio, or the glass fiber and the polyamide (PA) may be mixed in a certain ratio.

In some embodiments, the housing panel 2131 needs to have a certain thickness to ensure its stiffness. In some embodiments, the thickness of the housing panel 2131 is not less than 0.3 mm. According to preference for example, the thickness of the housing panel 2131 is not less than 0.5 mm, 0.8 mm, or 1 mm. But as the thickness increases, a weight of the housing 700 also increases, thereby increasing the self-weight of the bone conduction speaker 200, resulting in the sensitivity of the bone conduction speaker 200 being affected. Therefore, the thickness of the housing panel 2131 should not be too large. In some embodiments, the thickness of the housing panel 2131 is no more than 2.0 mm. According to preference for example, the thickness of the housing panel 2131 is no more than 1.5 mm.

In some embodiments, the housing panel 2131 may be set up in different shapes. For example, the housing panel 2131 may be set up as a square, a rectangle, an approximate rectangle (e.g., a structure where the four corners of the rectangle are replaced with curved shapes), an oval, a circle, or any other shape.

In some embodiments, the housing panel 2131 may include a same material. In some embodiments, the housing panel 2131 may be disposed of two or more materials in a laminated layer. In some embodiments, the housing panel 2131 may include a layer of a material with a higher Young's modulus, plus a layer of a material with a lower Young's modulus in combination. This has the advantage of ensuring the stiffness requirements of the housing panel 2131 while also increasing the comfort of contact with the human face and improving the fit of the housing panel 2131 and the human face contact. In some embodiments, the material with the higher Young's modulus may be an acrylonitrile butadiene styrene (ABS) copolymer, a Polystyrene (PS), a high impact polystyrene (HIPS), a polypropylene (PP), a polyethylene terephthalate (PET), a polyester (PES), a polycarbonate (PC), a Polyamides (PA), a polyvinyl chloride (PVC), a polyurethane (PU), a polyvinylidene chloride, a polyethylene (PE), a polymethyl methacrylate (PMMA), a Poly-ether-ether-ketone (PEEK), a Phenolics (PF), a urea-formaldehyde resins (UF), a melamine formaldehyde resins (MF), and any of a number of metals, alloys (such as aluminum alloys, chromium-molybdenum steel, scandium alloys, magnesium alloys, titanium alloys, magnesium-lithium alloys, nickel alloys, etc.), a glass fiber or a carbon fiber, or a combination of any of these materials.

In some embodiments, a portion of the housing panel 2131 that is in contact with human skin may be all or a portion of the area of the housing panel 2131. For example, the housing panel 2131 is an arcuate structure with only a portion of the area on the arcuate structure in contact with human skin. In some embodiments, the housing panel 2131 and the human skin may be in contact with the face. In some embodiments, a surface of the housing panel 2131 in contact with the human body may be a flat surface. In some embodiments, an outer surface of the housing panel 2131 may have a number of bumps or pits. In some embodiments, the outer surface of the housing panel 2131 may be a curved surface of arbitrary contour.

It should be noted that, since the vibration element 211 includes a magnetic circuit assembly, and the vibration element 211 is accommodated within the vibration housing 213. Thus, the larger the volume (i.e., the volume of the accommodating space) of the vibration housing 213, the larger the magnetic circuit assembly can be accommodated within the vibration housing 213, thereby allowing the bone conduction speaker 200 to have a higher sensitivity. The sensitivity of the bone conduction speaker 200 may be reflected by the volume level produced by the bone conduction speaker 200 under the input of a certain sound signal. When the same sound signal is input, the higher the volume generated by the bone conduction speaker 200, the higher the sensitivity of the bone conduction speaker 200. In some embodiments, the volume of the bone conduction speaker 200 becomes louder as the volume of the accommodating space of the vibration housing 213 increases. Therefore, this present disclosure also has certain requirements for the volume of the vibration housing 213. In some embodiments, in order for the bone conduction speaker 200 have a high sensitivity (volume), the volume of the vibration housing 213 may be 2000 $mm^3$~6000 $mm^3$. According to preference for example, the volume of the vibration housing 213 may be 2000 $mm^3$~5000 $mm^3$, 2800 $mm^3$~5000 $mm^3$, 3500 $mm^3$~5000 $mm^3$, 1500 $mm^3$~3500 $mm^3$, or 1500 $mm^3$~2500 $mm^3$.

The fixation assembly 230 is fixedly connected to the vibrating housing 213 of the vibration assembly 210, and the fixation assembly 230 is used to maintain a stable contact of the bone conduction speaker 200 with the human tissue or bones to avoid shaking of the bone conduction speaker 200 and to ensure that the housing panel 2131 is stable for the sound transmission. In some embodiments, the fixation assembly 230 may be an arc-shaped elastic assembly, capable of forming a force that springs back toward the middle of the arc to enable stable contact with the human skull. In the case of ear hooks as a fixation assembly, for example, on the basis of FIG. 2, the top p point of the ear hook fits well with the human head, and the top p point may be considered as the fixation point. The ear hook is fixedly connected to the housing side panel 2132, and the way of fixed connection includes using glue bonding to fix, or fixing the ear hook to the housing side panel 2132 or the housing back panel 2133 by means of snap-in, welding or threaded connection. The portion of the ear hook that is connected to the vibration housing 213 may be made of the same, different, or partially the same material as the housing side panel 2132 or the housing back panel 2133. In some embodiments, a plastic, a silicone, and/or a metallic material may also be included in the ear hook in order for the ear hook to have less stiffness (i.e., a smaller stiffness factor). For example, the ear hook may include a rounded titanium wire. Optionally, the ear hook may be integrally molded with the housing side panel 2132 or the housing back panel 2133. Further examples of the vibration assembly 210 and vibration housing 213 can be found with reference to PCT application Nos. PCT/CN2019/070545 and PCT/CN2019/070548 filed on Jan. 5, 2019, the entire contents of which are incorporated by reference into this present disclosure.

As described above, the vibration assembly 210 may also include a second elastic element 215. The second elastic element 215 may be used to elastically connect the vibration element 211 to the vibration housing 213 such that the mechanical vibration of the vibration element 211 may be transmitted to the vibration housing 213 via the second elastic element 215. When the vibration housing 213 generates the mechanical vibration by making contact with the wearer's (or user's) face, the mechanical vibration is transmitted through the bones to the auditory nerve so that the human body hears the sound.

In some embodiments, the vibration element 211 and the second elastic element 215 may be accommodated within the interior of the vibration housing 213, and the second elastic element 215 may connect the vibration element 211 to the inner wall of the vibration housing 213. In some embodiments, the second elastic element 215 may include a first part and a second part. The first part of the second elastic element 215 may be connected to the vibration element 211 (e.g., the magnetic circuit assembly of the vibration element 211), and the second part of the second elastic element 215 may be connected to the inner wall of the vibration housing 213.

In some embodiments, the second elastic element 215 may be a transducer. The first part of the transducer may be connected to the vibration element 211, and the second part of the transducer may be connected to the vibration housing 213. Specifically, the first part of the transducer may be connected to the magnetic circuit assembly of the vibration element 211, and the second part of the transducer may be connected to the inner wall of the vibration housing 213. Optionally, the transducer has an annular structure, with the first part of the transducer being closer to a central region of the transducer than the second part. For example, the first part of the transducer may be located in the central region of the transducer, while the second part is located on a circumference of the transducer.

In some embodiments, the transducer may be an elastic member to enable a transmission of the mechanical vibration of the vibration element 211 to the vibration housing 213. The elasticity of the transducer may be determined by various aspects of a material, a thickness, a structure, etc. of the transducer.

In some embodiments, the material used to make the transducer includes, but is not limited to, a plastic (e.g., but not limited to, polymer polyethylene, blown nylon, engineering plastic, etc.), a steel (e.g., but not limited to, stainless steel, carbon steel, etc.), a lightweight alloy (e.g., but not limited to, aluminum alloy, beryllium copper, magnesium alloy, titanium alloy, etc.), or other single or composite materials capable of achieving the same properties. The composite material may include, but is not limited to, a reinforcement material such as a glass fiber, a carbon fiber, a boron fiber, a graphite fiber, a graphene fiber, a silicon carbide fiber, or an aramid fiber, or a compound of other organic and/or inorganic materials, such as, for example, a glass fiber reinforced unsaturated polyester, an epoxy resin, or a phenolic resin matrix composed of various types of FRP.

In some embodiments, the transducer may have a certain thickness. According to preference for example, in some embodiments, the thickness of the transducer is 0.005 mm to 3 mm, 0.01 mm to 2 mm, 0.01 mm to 1 mm, or 0.02 mm to 0.5 mm.

In some embodiments, the elasticity of the transducer may be provided by the structure of the transducer. For example, the transducer may be an elastic structural body, and the elasticity may be provided by the structure of the transducer even though the material used to make the transducer has a high stiffness. In some embodiments, the structure of the transducer may include, but is not limited to, a spring-like structure, a ring or ring-like structure, etc. In some embodiments, the structure of the transducer may also be set in a sheet form. In some embodiments, the structure of the transducer may also be set in the form of a strip. The specific structure of the transducer may be combined based on the material, thickness, and structure described above to form different transducers. For example, the sheet-like transducer may have a different thickness distribution, with the thickness of the first part of the transducer being greater than the thickness of the second part of the transducer. In some embodiments, the number of transducers may be one or more. For example, there can be two transducers, and the second parts of the two transducers are connected to the inner walls of the two housing side panels 2132 at opposite positions, and the first parts of the two transducers are connected to the vibration element 211.

In some embodiments, the transducer may be directly connected to the vibration housing 213 and the vibration element 211. In some embodiments, the transducer may be connected to the vibration element 211 and the vibration housing 213 by adhesive. In some embodiments, the transducer may also be fixed to the vibration element 211 and the vibration housing 213 by welding, clamping, riveting, threaded connection (e.g., connection by screws, screws, screws, bolts, and other components), clamp connection, pin connection, wedge key connection, and one-piece molding. Further examples of the transducer can be found in the PCT applications Nos. PCT/CN2019/070545 and PCT/CN2019/070548 filed on Jan. 5, 2019, the entire contents of which are incorporated by reference into this present disclosure.

In some embodiments, the vibration assembly 210 may also include a first connection member. The transducer may be connected to the vibration element 211 via the first connection member. In some embodiments, the first connection member may be fixedly connected to the vibration element 211, as shown in FIG. 2. For example, the first connection member may be fixed to a surface of the vibration element 211. In some embodiments, the first part of the vibration element 211 may be fixedly connected to the first connection member. In some embodiments, the transducer may also be fixed to the first connection member by welding, snap-fitting, riveting, threaded connection (e.g., connection by screws, screws, bolts, and other components), clamp connection, pin connection, wedge key connection, and one-piece molding. In some embodiments, the vibration assembly 210 may also include a second connection member (not shown in the figures), which may be fixed to the inner wall of the vibration housing 213, for example, the second connection member may be fixed to the inner wall of the housing side panel 2132. The transducer may be connected to the vibration housing 213 via the second connection member. In some embodiments, the second part of the vibration element 211 may be fixedly connected to the second connection member. The second connection member may be connected to the vibration element in the same or similar manner as the first connection member is connected to the vibration element in the preceding embodiments, which will not be described here.

Figure 3:
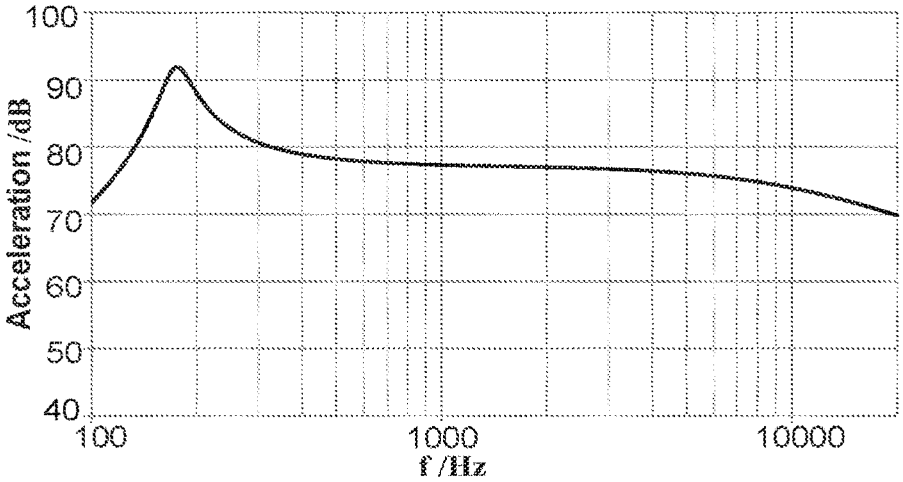
FIG. 3 is a partial frequency response curve illustrating a bone conduction speaker without adding a resonance assembly according to some embodiments of the present disclosure.

FIG. 3 is a partial frequency response curve illustrating a bone conduction speaker without adding a resonance assembly, according to some embodiments of the present disclosure. The horizontal axis is a frequency, and the vertical axis is a vibration intensity (or vibration amplitude) of the bone conduction speaker 200. The vibration intensity mentioned here may also be understood as a vibration acceleration of the bone conduction speaker 200. The larger the value on the vertical axis, the greater the vibration amplitude of the bone conduction speaker 200, which also indicates the stronger the vibration sensation of the bone conduction speaker 200. For ease of description, in some embodiments, a sound frequency range below 500 Hz may be referred to as a low frequency region, a sound frequency range from 500 Hz to 4000 Hz may be referred to as a medium frequency region, and a sound frequency range greater than 4000 Hz may be referred to as a high frequency region. In some embodiments, the sound in the low frequency region may bring the user a more pronounced vibration sensation, if there are very sharp peaks in the low frequency region (i.e., the vibration acceleration of certain frequencies is much higher than the vibration acceleration of other nearby frequencies), on the one hand, the user may hear the sound as being more harsh and sharp; on the other hand, the strong vibration sensation may also cause discomfort. Therefore, in the low frequency region range, it is not desirable to appear very sharp peaks and valleys, the flatter the frequency response curve, the better the sound of the bone conduction speaker 200.

As shown in FIG. 3, the bone conduction speaker 200 generates a low frequency resonance peak in the low frequency region (near 100 Hz). This low frequency resonance peak may be generated by the vibration assembly 210 acting in conjunction with the fixation assembly 230. The vibration acceleration of this low frequency resonance peak is large, resulting in a strong vibration sensation of the vibration panel 2131, which makes the user's face feel pain when wearing the bone conduction speaker 200, affecting the comfort and experience of the user's use.

Figure 4:
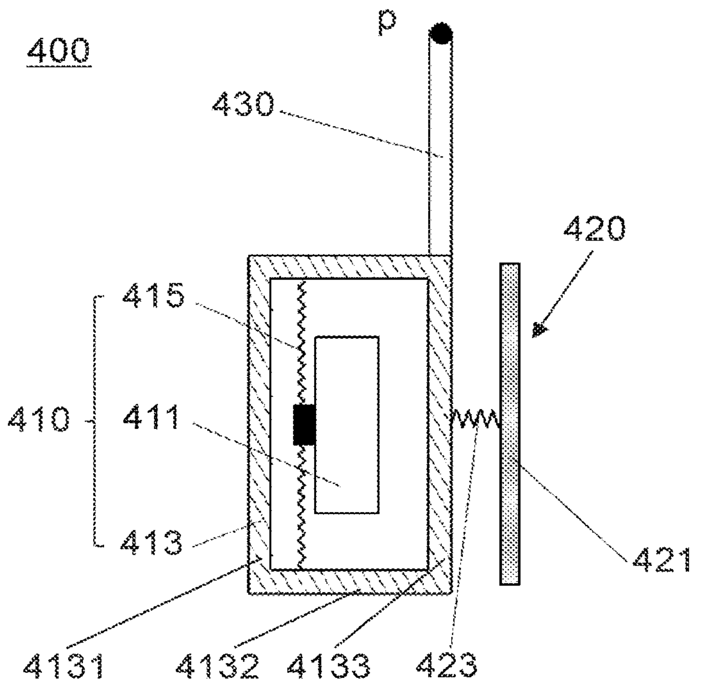
FIG. 4 is a schematic diagram illustrating a longitudinal cross-section of a bone conduction speaker with adding a resonance assembly according to some embodiments of the present disclosure.

FIG. 4 is a schematic diagram illustrating a longitudinal cross-section of a bone conduction speaker with adding a resonance assembly according to some embodiments of the present disclosure. As shown in FIG. 4, in some embodiments, the bone conduction speaker 400 includes a vibration assembly 410 and a resonance assembly 420. The resonance assembly 420 is elastically connected to the vibration assembly 410 and may transmit a mechanical vibration to the resonance assembly 420 when the vibration assembly 410 undergoes the mechanical vibration. When the resonance assembly 420 is forced to vibrate, it can absorb the mechanical force of the vibration assembly 410, thereby weakening the vibration amplitude of the vibration assembly 410.

In some embodiments, the vibration assembly 410 may include a vibration element 411, a vibration housing 413, and a second elastic element 415. The vibration housing 413 is elastically connected to the vibration element 411 by the second elastic element 415. The vibration housing 413 may be driven to vibrate mechanically when the vibration element 411 vibrates mechanically. In some embodiments, the vibration element 411, the vibration housing 413, and the second elastic element 415 are the same as or similar to the vibration element 211, the vibration housing 213, and the second elastic element 215 in the bone conduction speaker 200, respectively, and the details of their structures are not repeated here.

In some embodiments, the resonance assembly 420 may include a mass element 421 and a first elastic element 423, with the first elastic element 423 being fixedly connected to the mass element 421. The mass element 421 may be connected to the vibration assembly 410 via the first elastic element 423. The vibration housing 413 may transmit the mechanical vibration to the mass element 421 through the first elastic element 423 to drive the mass element 421 to mechanically vibrate. When the mass element 421 generates the mechanical vibration, the vibration acceleration, i.e., the vibration intensity, of the vibration housing 413 may be weakened, thereby reducing the vibration sensation of the vibration housing 413 and improving the user experience. In some embodiments, the first elastic element 423 may be connected to any other position on the vibration housing 413, except for the housing panel on the vibration housing 413 that is in direct contact with the user. For example, the first elastic element 423 may be connected to the housing side panel 4132 or the housing back panel 4133. In this case, since the resonance assembly 420 is not in direct contact with human skin, the vibration of the resonance assembly 420 does not cause the user to feel an uncomfortable vibration sensation. In the embodiments shown in FIG. 4, the first elastic element 423 may be connected to the external side of the vibration housing 413 on a side opposite the housing panel 4131.

Figure 5:
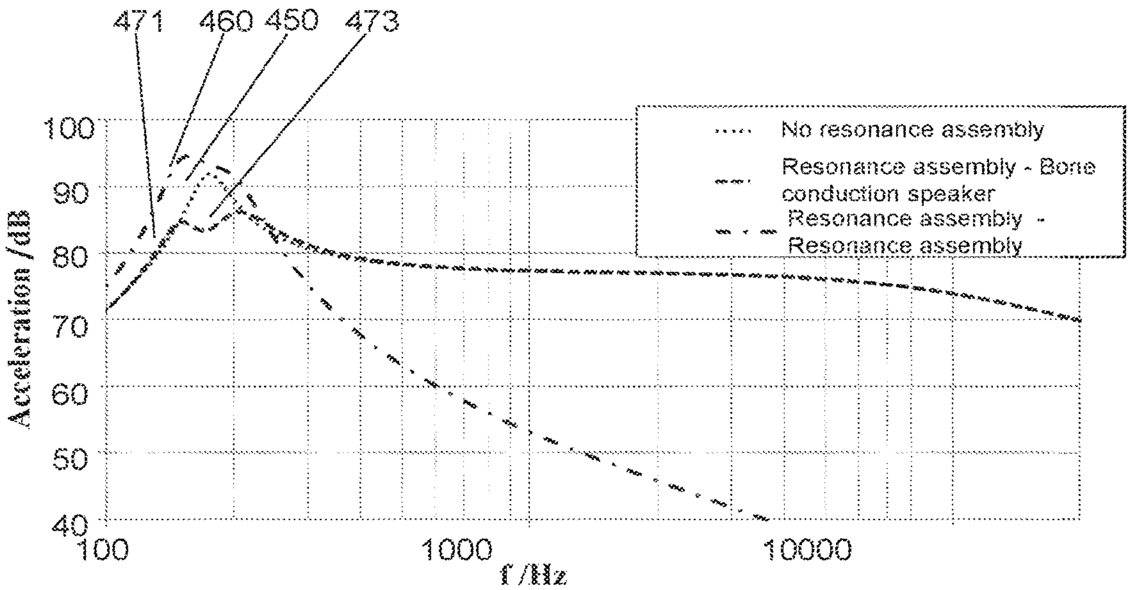
FIG. 5 is a partial frequency response curve illustrating a bone conduction speaker with adding a resonance assembly according to some embodiments of the present disclosure.

FIG. 5 is a partial frequency response curve illustrating a bone conduction speaker with adding a resonance assembly, according to some embodiments of the present disclosure. FIG. 5 also illustrates a frequency response curve of the resonance assembly. According to FIG. 5, it can be seen that under the influence of the resonance assembly 420, the frequency response curve of the bone conduction speaker 400 in the low frequency region can become flatter, avoiding the strong vibration sensation caused by a sharp resonance peak and improving the user experience.

Figure 10:
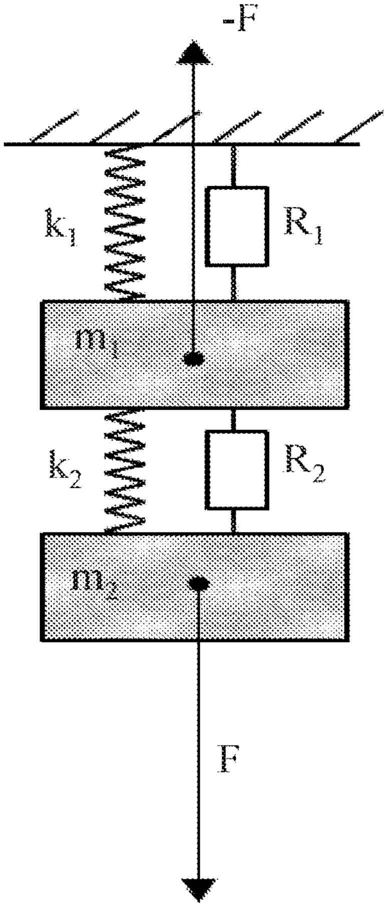
FIG. 10 is a schematic diagram illustrating a simplified mechanical model of a bone conduction speaker without adding a resonance assembly according to some embodiments of the present disclosure.

For ease of understanding, when the bone conduction speaker does not include a resonance assembly, the mechanical model of the bone conduction speaker may be equated to the model shown in FIG. 10. Specifically, the vibration panel and vibration element may be simplified as a mass block $m_1$ and a mass block $m_2$, respectively, the ear hook may be simplified as an elastic connector $k_1$, the second elastic element may be simplified as an elastic connector $k_2$, and the damping of the elastic connectors $k_1$ and $k_2$ is $R_1$ and $R_2$, respectively. The vibration panel and vibration element are subjected to the forces F and −F, respectively, to generate a vibration. The composite vibration system consisting of the vibration panel, the vibration element, the transducer, and the ear hook is fixed at the top p point of the ear hook.

Figure 11:
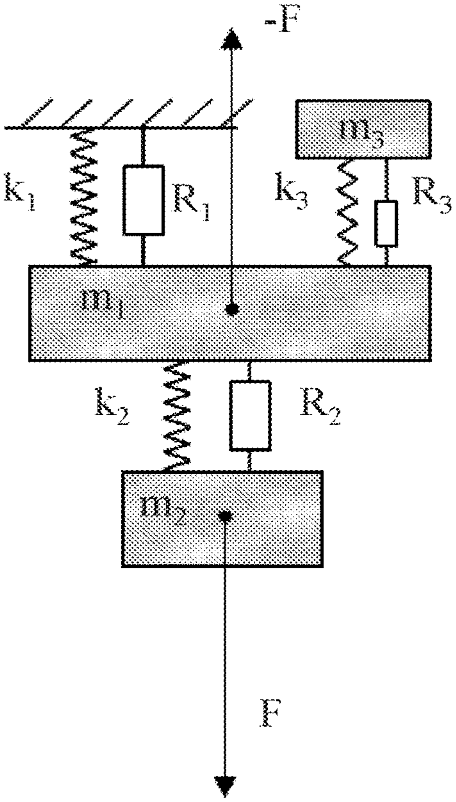
FIG. 11 is a schematic diagram illustrating a simplified mechanical model of a bone conduction speaker with adding a resonance assembly, according to some embodiments of the present disclosure.

Similarly, for ease of understanding, when the bone conduction speaker includes a resonance assembly, the mechanical model of the bone conduction speaker may be equated to the model shown in FIG. 11.

Specifically, $m_1$ and $m_2$ represent the masses of the vibration housing and the vibration element, respectively, $m_3$ represents the mass of the mass element in the resonance assembly, $k_1$ and $R_1$ represent the elasticity and damping of the fixation assembly, respectively, $k_2$ and $R_2$ represent the elasticity and damping of the second elastic element, respectively, and $k_3$ and $R_3$ represent the elasticity and damping of the first elastic element. The whole composite vibration system is fixed at the top p point of the ear hook, and the vibration surface housing and the vibration element are subjected to the forces F and −F, respectively, to produce the vibration. When the resonance assembly is added, it is equivalent to increase the stiffness and damping of the vibration housing, while the amperometric force F does not change, and the reaction force−F of the amperometric force also does not change, while the stiffness and damping of the vibration housing are increased, so the addition of the resonance assembly can weaken the vibration amplitude of the vibration housing.

It can be understood that the vibration assembly 410 and the resonance assembly 420 can each generate a low frequency resonance peak in the low frequency region, and using the resonance assembly 420 to absorb the mechanical vibration of the vibration housing 413 can achieve the purpose of reducing the amplitude of the mechanical vibration of the vibration housing 413 at its resonance peak. Specifically, as shown in FIG. 5, the curve "without resonance assembly" indicates the frequency response without the resonance assembly 420 added to the bone conduction speaker 400, it can be seen that the vibration assembly 410 (combined with the fixation assembly 230) can generate a first low frequency resonance peak 450 at the first frequency f. The curve "with resonance assembly-resonance assembly" indicates the frequency response of the resonance assembly 420 itself, and it can be seen that the resonance assembly 420 can generate a second low frequency resonance peak 460 at the second frequency $f_0$. The curve "with resonance assembly-bone conduction speaker" represents the frequency response of the bone conduction speaker 400 resulting from the interaction of the vibration assembly 410 and the resonance assembly 420, and it can be seen that the frequency response of the bone conduction speaker 400 with the resonance assembly 420 added is flatter in the low frequency region compared to that of the bone conduction speaker (for example, the bone conduction speaker 200 shown in FIG. 2) without the resonance assembly 420 added. The frequency response in the low frequency region of the bone conduction speaker (for example, the bone conduction speaker 200 shown in FIG. 2) is flatter, and its amplitude near the first frequency f is significantly lower than that without the resonance assembly 420. The first frequency f is an intrinsic frequency of the vibration assembly 410 (in combination with the fixation assembly 230), and the second frequency $f_0$ is an intrinsic frequency of the resonance assembly 420. In some embodiments, the intrinsic frequency is related to a material, a mass, a coefficient of elasticity, and a shape of the structure itself.

It should be noted that the vibration element 411 transmits the mechanical vibration to the vibration housing 413 via the second elastic element 415, and the vibration housing 413 is forced to vibrate, and the vibration housing 413 vibrates at the same frequency as the vibration element 411. Similarly, the vibration housing 413 transmits the mechanical vibration to the mass element 421 of the resonance assembly 420 through the first elastic element 423, causing the mass element 421 to be forced to move, and the vibration frequency of the mass element 421 is the same as the vibration frequency of the vibration housing 413. As can be seen from FIG. 5, in the frequency response of the resonance assembly 420 itself, the vibration acceleration of the resonance assembly 420 increases with increasing frequency in the range from 100 Hz to the second frequency $f_0$. When the frequency is the second frequency f0, the second low frequency resonant peak 460 occurs. As the frequency continues to increase, the vibration acceleration of the resonance assembly 420 decreases as the frequency increases. It can be understood that the frequency response of this resonance assembly 420 can reflect the response of the resonance assembly 420 to external vibrations of different frequencies (i.e., the vibration of the vibration housing 413). For example, at and near the second frequency f0, the resonance assembly 420 may absorb the most mechanical energy from the vibration housing 413. This brings the advantage that the resonance assembly 420 mainly reduces the vibration of the vibration housing 413 near its low frequency resonance peak, and has little or no effect on the vibration of the vibration housing 413 near the non-low-frequency resonance peak, which can make the final frequency response curve of the bone conduction speaker 400 flatter and better sound quality.

In some embodiments, to weaken the vibration intensity of the first low frequency resonance peak 450 of the vibration housing 413, the frequency f0 corresponding to the second resonance peak 460 of the resonance assembly 420 may be set near the frequency f corresponding to the first resonance peak 450 of the vibration housing 413. Referring to FIG. 5, in some embodiments, a ratio of the second frequency $f_0$ to the first frequency f is in a range of 0.5~2. According to preference for example, the ratio of the second frequency $f_0$ to the first frequency f is in the range of 0.65~1.5, 0.75~1.2, 0.85~1.15, or 0.9~1.1.

To broaden the frequency response range of the bone conduction speaker 400, the low frequency resonance peak of the vibration assembly 410 and the resonance assembly 420 may be set at a lower frequency by changing the structure and material of the vibration assembly 410 and the resonance assembly 420. In some embodiments, the first low frequency resonance peak 450 and the second low frequency resonance peak 460 may both be disposed in the low frequency region. According to preference for example, both the first frequency f and the second frequency $f_0$ may be less than 800 Hz., 700 Hz, 600 Hz, or 500 Hz.

In some embodiments, by optimizing the structure and material of the resonance assembly 420 (e.g., optimizing the mass of the mass element 421, the elastic coefficient of the first elastic element 423, etc.), the resonance assembly 420 may generate a greater vibration than the vibration housing 413 when the vibration housing 413 transmits the vibration to the resonance assembly 420. For example, in at least a portion of the frequency range less than (or greater than) the first frequency f, the resonance assembly 420 may vibrate at an amplitude greater than the vibration amplitude of the vibration housing 413. At this point, since the resonance assembly 420 is not in direct contact with the user, the large vibration of the resonance assembly 420 does not cause the user to feel an uncomfortable vibration sensation. Further, due to the larger amplitude of the resonance assembly 420, the mass element 421 in the resonance assembly 420 may be designed with a larger area structure, and while the resonance assembly 420 vibrates, the vibration of the mass element 421 with a large area can drive the air to vibrate, generating a low-frequency air conduction sound, thereby enhancing the low frequency response of the bone conduction speaker 400.

As further shown in FIG. 5, the bone conduction speaker 400 may generate two low frequency resonance peaks in the low frequency region, a third low frequency resonance peak 471 and a fourth low frequency resonance peak 473, under the interaction of the vibration housing 413 and the resonance assembly 420. the vibration acceleration of the third low frequency resonance peak 471 and the fourth low frequency resonance peak 473 is smaller than the first low frequency resonance peak 450, which means that the bone conduction speaker 400 with the resonance assembly 420 has a lower vibration amplitude of the low frequency resonance peaks than the bone conduction speaker without the resonance assembly 420 (e.g., the bone conduction speaker 200 shown in FIG. 2), and the user has a better experience when wearing the bone conduction speaker 400. In some embodiments, the bone conduction speaker may generate two low frequency resonance peaks in a frequency range of less than 450 Hz. According to preference for example, the bone conduction speaker 400 may generate two low frequency resonance peaks in the frequency range of less than 400 Hz, 350 Hz, 300 Hz, or 200 Hz.

When the mass $m_3$ of the mass element 421 of the resonance assembly 420 is very small, the effect of the resonance assembly 420 on the amplitude of the mechanical vibration of the vibration housing 413 is small, resulting in ineffective weakening of the mechanical vibration near the first low frequency resonance peak 450 of the vibration housing 413. For example, if the mass $m_3$ of the mass element 421 of the resonant assembly 420 is too small, even if the resonance assembly 420 is increased, the vibration acceleration of the first low frequency resonance peak 450 of the vibration housing 413 is still large and cannot effectively weaken the vibration sensation of the bone conduction speaker 400. And when the mass $m_3$ of the mass element 421 of the resonance assembly 420 is very large, the effect of the resonance assembly 420 on the amplitude of the mechanical vibration of the bone conduction speaker 400 is too large and will significantly change the frequency response of the bone conduction speaker 400. Therefore, the mass $m_3$ of the mass element 421 of the resonance assembly 420 needs to be controlled within a certain range.

In some embodiments, a ratio of the mass $m_3$ of the mass element 421 of the resonance assembly 420 to the mass $m_1$ of the vibration housing 413 is in a range of 0.04~1.25, 0.05~1.2, 0.06~1.1, 0.07~1.05, 0.08~0.9, 0.09~0.75, or 0.1~0.6.

Figure 6:
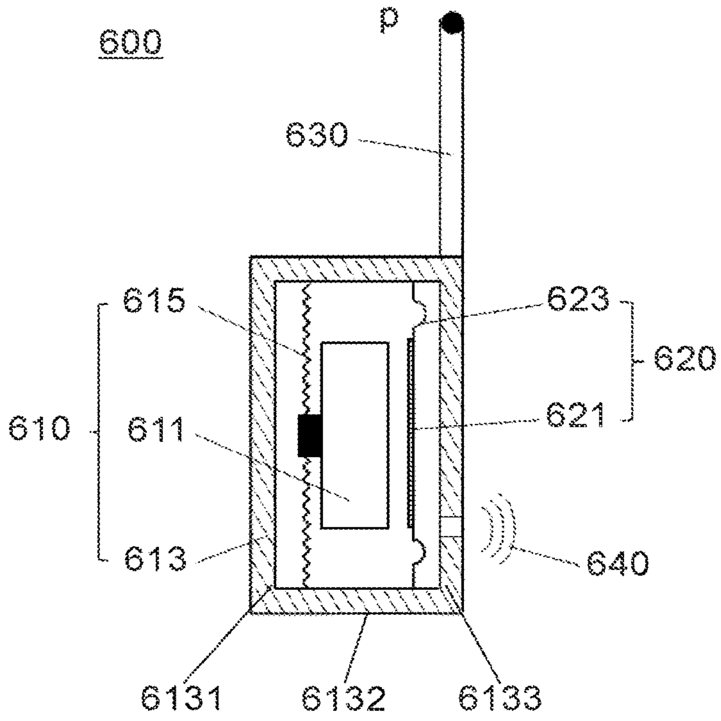
FIG. 6 is a schematic diagram illustrating a longitudinal cross-section of another bone conduction speaker according to some embodiments of the present disclosure.

FIG. 6 is a schematic diagram illustrating a longitudinal cross-section of another bone conduction speaker according to some embodiments of the present disclosure. As shown in FIG. 6, the bone conduction speaker 600 may include a vibration assembly 610 and a resonance assembly 620. The vibration assembly 610 may generate a mechanical vibration. The resonance assembly 620 may receive the mechanical vibration from the vibration assembly 610, weakening an amplitude of the mechanical vibration of the vibration assembly 610.

In some embodiments, the vibration assembly 620 may include a vibration element 611, a vibration housing 613, and a second elastic element 615. The vibration element 611 may be elastically connected to the vibration housing 613 by the second elastic element 615. When the vibration element 611 is mechanically vibrated, the vibration housing 613 may be driven to mechanically vibrate, which in turn transmits a vibration to the tissues and bones of the face of the user, and through the tissues and bones to the auditory nerve, enabling the user to hear a sound. In some embodiments, the vibration element 611, the vibration housing 613, and the second elastic element 615 are the same as or similar to the vibration element 211, the vibration housing 213, and the second elastic element 215 in the bone conduction speaker 200, respectively, and the details of their structures are not repeated here.

In some embodiments, the resonance assembly 620 may include a first elastic element 623 and a mass element 621. The mass element 621 may be elastically connected to the vibration housing 613 by the first elastic element 623. The vibration housing 613 transmits a vibration to the mass element 621 through the first elastic element 623 such that the mechanical vibration of the vibration housing 613 is partially absorbed by the mass element 621, thereby weakening the amplitude of the vibration of the vibration housing 613.

As shown in FIG. 6, the resonance assembly 620 may be accommodated within the vibration housing 613, and the resonance assembly 620 may be connected to the inner wall of the vibration housing 621 by the first elastic element 623.

In some embodiments, the first elastic element 623 may include a diaphragm. A circumference of the diaphragm may be connected by a support structure or directly to the inner part of a housing side panel 6132 of the vibration housing 613. The housing side panel 6132 is a side wall disposed around a housing panel 6131. When the vibration of the vibration housing 613 occurs, the housing side panel 6132 may cause a vibration of the diaphragm. The diaphragm here can be called a passive diaphragm since it is connected to the vibration housing 613 and vibrates through a drive of the vibration housing 613. In some embodiments, the diaphragm may include, but is not limited to, a plastic diaphragm, a metal diaphragm, a paper diaphragm, a biological diaphragm, etc.

In some embodiments, the mass element 621 may include a composite structure. The composite structure may be affixed to a surface of the diaphragm to form a composite diaphragm (i.e., the resonance assembly 620). The composite structure affixed to the surface of the diaphragm mainly plays the following roles: (1) the composite structure 621 may be used as a counterweight element to adjust a mass of a composite diaphragm, so that the composite diaphragm as a whole is within a certain mass range, which makes the passive diaphragm itself have the effect of a larger vibration amplitude, and can effectively play a role in weakening the vibration amplitude of the bone conduction speaker 600 in the low frequency region range; (2) the composite structure 621 and the diaphragm combined to form a composite diaphragm structure, with higher stiffness, a composite diaphragm surface is not easy to produce higher-order mode, to avoid more peaks and valleys in the frequency response of the passive diaphragm. The mass of the mass element 621, and the frequency response of the composite diaphragm formed by the mass element 621 and the diaphragm may be the same as or similar to a mass element (e.g., the mass element 421) and the resonance assembly (e.g., the resonance assembly 420) in other embodiments of this present disclosure, which will not be described here.

In some embodiments, the composite structure may include, but is not limited to, one of a paper cone, an aluminum sheet, or a copper sheet, or a combination thereof. In some embodiments, the composite structure may be made from the same material. For example, the composite structure may be the paper cone or the aluminum sheet. In some embodiments, the composite structure may be made of different materials. For example, the composite structure may be a combination of the paper cone and the copper sheet. As another example, the composite structure may be a structure made according to a mixture of aluminum or copper in a certain ratio.

In some embodiments, the way in which the composite structure is connected to the diaphragm may include, but is not limited to, using a glue bond fixing, or a welding, snapping, riveting, threaded connection (screw, screw, bolt, etc.), interference connection, clamp connection, pin connection, wedge key connection, or formed connection.

It can be understood that the diaphragm, when vibrating, causes the air within the vibration housing 613 to vibrate, thereby producing a sound. Thus, in some embodiments, the vibration housing 613 may be disposed with at least one sound outlet hole 640 to direct the sound generated by the vibration of the diaphragm out of the vibration housing 613, and this directed sound may be at least partially perceived by the human ear. This part of the sound can enhance the response of the bone conduction speaker 600 in the low frequency region, so that the bone conduction speaker 600 in the low frequency vibration sense becomes weaker, but still able to maintain a certain volume.

In some embodiments, the at least one sound outlet hole 640 may be disposed at any position of the vibration housing 613. In some embodiments, the at least one sound outlet hole 640 may be disposed on a side of the vibration housing 613 with a back facing the face of the user, i.e., on the housing back panel 6133. In some embodiments, the at least one sound outlet hole 640 may also be disposed on the housing side panel 6132, for example, on the housing side panel 6132 facing the user's ear canal. In other embodiments, the at least one sound outlet hole 640 may also be disposed at a corner of the vibration housing 613, e.g., where the housing side panel 6132 is connected to the housing back panel 6133. In some embodiments, the number of sound outlet holes 640 may be multiple. The multiple sound outlet holes 640 may be disposed in different positions. For example, a portion of the multiple sound outlet holes 640 may be disposed on the housing back panel 6133 and another portion may be disposed on the housing side panel 6132. In some embodiments, at least a portion of the sound derived through at least one of the sound outlet holes 640 may be directed to the user's ear, improving the low frequency response of the bone conduction speaker 600. In some embodiments, the above may be achieved by setting the at least one sound outlet hole 640 in a position facing the human ear. For example, the user wears the bone conduction speaker 600 with the housing side panel 6132 facing the human ear, so the at least one sound outlet hole 640 may be provided on the housing side panel 6132, and the sound is exported through the sound outlet hole 640 and at least a portion of it may be guided to the human ear. In some embodiments, additional sound conduction structures may be provided to achieve the above purposes. For example, an acoustic conduit may be disposed at an outlet of at least one of the sound outlet holes 640, through which the sound is guided in the direction of the human ear.

In some embodiments, a cross-sectional shape of the sound outlet hole 640 may include, but is not limited to, a circle, a square, a triangle, a polygon, or the like.

In some embodiments, the bone conduction speaker 600 may also include a fixation assembly 630, and the fixation assembly 630 may be fixedly connected to the vibration housing 613. The fixation assembly 630 may be used to maintain a stable contact between the bone conduction speaker 600 and the face of the user (e.g., the wearer), to avoid shaking of the bone conduction speaker 600, and to ensure a stable sound delivery of the bone conduction speaker 600.

In some embodiments, the more pronounced the low frequency response of the bone conduction speaker 600 at the first resonance peak 450 (i.e., high vibration acceleration and high sensitivity) when the stiffness of the fixation assembly 630 is smaller (i.e., smaller stiffness coefficient), the more beneficial it is to improve the sound quality of the bone conduction speaker 600. On the other hand, when the stiffness of the fixation assembly 630 is smaller (i.e., the stiffness coefficient is small), it is beneficial to the vibration of the vibration housing 613.

In some embodiments, the fixation assembly 630 may be directly fixedly connected to the vibration housing 613. In some embodiments, the fixation assembly 630 and the vibration housing 613 may be connected to each other by a connection member. In some embodiments, the fixation assembly 630 may include a fixation connection member. The fixation connection member may connect the fixation assembly 630 to the vibration housing 613. In some embodiments, the fixation connection member may be one or a combination of one or more of a silicone, a sponge, a plastic, a spring, a carbon sheet.

In some embodiments, the fixation assembly 630 may be in a form of an ear hook. The fixation assembly 630 has a vibration housing 613 connected to each end of the fixation assembly 630, fixing the two vibration housings 613 to each side of the human skull in the form of the ear hook. In some embodiments, the fixation assembly 630 may be a single-ear ear clip. The fixation assembly 630 may be individually connected to the vibration housing 613 and fix the vibration housing 613 to a side of the human skull. The construction of the fixation assembly 630 may be the same as or similar to the fixation assembly in other embodiments of this present disclosure (e.g., the fixation assembly 230) and will not be described herein.

Figure 7:
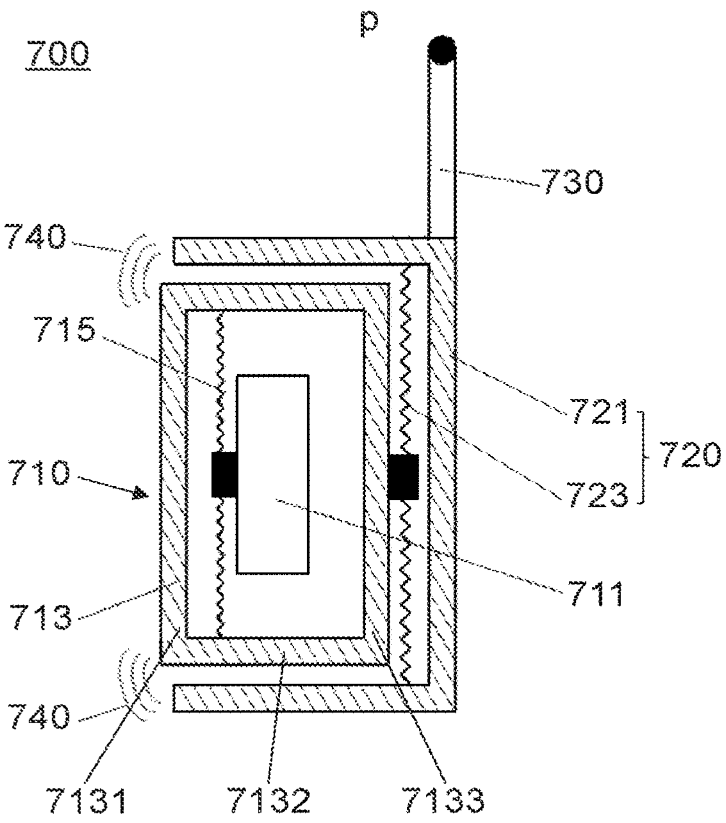
FIG. 7 is a schematic diagram illustrating a longitudinal cross-section of another bone conduction speaker according to some embodiments of the present disclosure.

FIG. 7 is a schematic diagram illustrating a longitudinal cross-section of another bone conduction speaker according to some embodiments of the present disclosure. As shown in FIG. 7, the bone conduction speaker 700 may include a vibration assembly 710 and a resonance assembly 720. The vibration assembly 710 may include a vibration element 711, a vibration housing 713, and a second elastic element 715. The second elastic element 715 is used to elastically connect the vibration element 711 and the vibration housing 713, and transmit a mechanical vibration of the vibration element 711 to the vibration housing 713. In some embodiments, the vibration element 711, the vibration housing 713, and the second elastic element 715 are the same as or similar to the vibration element 211, the vibration housing 213, and the second elastic element 215 in the bone conduction speaker 200, respectively, and the details of their structures are not repeated here.

The resonance assembly 720 may include a mass element 721 and a first elastic element 723. The mass element 721 may be elastically connected to the vibration housing 713 by the first elastic element 723. As described in FIG. 7, the resonance assembly 720 may be disposed outside of the vibration housing 713. The resonance assembly 720 may be connected to an outer wall of the vibration housing 713 by the first elastic element 723. When a mechanical vibration occurs in the vibration housing 713, the resonance assembly 720 may absorb a portion of a mechanical energy of the vibration housing 713, thereby weakening a vibration amplitude of the vibration housing 713.

In some embodiments, the mass element 721 may be set up in different shapes. For example, a square body, a near-square body (e.g., where the eight corners of the square body become curved), or an elliptical body, etc.

In some embodiments, the mass element 721 may be a recess member. The recess member may at least partially accommodate the vibration housing 713. In some embodiments, a recess cross-sectional shape of the recess member may be a circle, a square, a polygon, and other shapes. In some embodiments, the recess cross-sectional shape of the recess member may match an external contour of the vibration housing 713. For example, if the external profile of the vibration housing 713 is a rectangular shape, the recess cross-sectional shape of the recess member may be a square shape corresponding to it. In some embodiments, the vibration housing 713 may be completely contained in the recess of the recess member. In some embodiments, the vibration housing 713 may be partially accommodated in the recess of the recess member. For example, a housing panel 7131 and at least a portion of a housing side panel 7132 of the vibration housing 713 may be located outside of the recess to facilitate contact between the housing panel 7131 and the human skull and transmit a vibration. In some embodiments, the first elastic element 723 may connect a housing back panel 7133 to an inner wall of the recess member. For example, a first part of the first elastic element 723 is connected to the housing back panel 7133 and a second part of the first elastic element 723 is connected to the inner wall of the recess member. Assuming that the first elastic element 723 has an annular structure, the first part of the first elastic element 723 may be located in a central region of the annular structure, and the second part may be located on a circumference of the annular structure. In some embodiments, the first part of the first elastic element 723 may be connected to the housing back plate 7133, and a second part of the first elastic element 723 may be connected to a bottom panel of the recess member. In some embodiments, the first part of the first elastic element 723 may be connected to the housing side panel 7132, and the second part of the first elastic element 723 may be connected to a side panel of the recess member. In some embodiments, the vibration housing may include only the housing panel 7121 and the housing side panel 7132 without the housing back panel 7133. In this case, the resonance assembly 720 may be connected to the housing side panel 7132 or the inner wall of the vibration housing 713 by the first elastic element 723.

In some embodiments, the first elastic element 723 may be directly connected to the housing back panel 7133 and the recess member. In some embodiments, the first elastic element 723 may be connected to the housing back panel 7133 and the recess member via a connection member. For example, a third connection member may be fixed on the housing back panel 7133, and the first part of the first elastic element 723 may be fixedly connected to the third connection member. The recess member may be fixed with a fourth connection member, and the second part of the first elastic element 723 may be fixedly connected to the fourth connection member. In some embodiments, a mass of the mass element 721, and a frequency response of the resonance assembly 720 formed by the mass element 721 and the first elastic element 723 may be the same or similar to that of a mass element (e.g., the mass element 421) and a resonance assembly (e.g., the resonance assembly 420) in other embodiments of the present disclosure, which will not be described herein.

In some embodiments, an internal dimension of the recess member may be larger than an external dimension of the vibration housing 713, at which point a cavity may be formed between the vibration housing 713 and the recess member. The vibration housing 713 and the recess member may drive the air in the cavity to vibrate when vibrating to produce a sound. For example, in the embodiment shown in FIG. 7, there is a gap between the side wall of the recess member and the housing side panel 7132, and the gap may be used as an acoustic channel 740. The human ear can partially receive the sound, to a certain extent, to enhance the effect of low frequency and increase the volume.

In some embodiments, the bone conduction speaker 700 may further include a fixation assembly 730. The fixation assembly 730 may be used to keep the bone conduction speaker 700 in contact with the skull of the user's face. In some embodiments, the fixation assembly 730 may be fixedly connected to the resonance assembly 720. For example, the fixation assembly 730 may be fixedly connected to or integrally molded with the mass element 721 (e.g., a recess member). In some embodiments, the fixation assembly 730 may be fixedly connected directly to the recess member. In some embodiments, the fixation assembly 730 may also be connected to the recess member via a fixation connection member.

In some embodiments, the fixation assembly 730 may be in the form of an ear hook. The fixation assembly 730 has a recess member and a vibration housing 713 accommodated in the recess member attached to each end of the fixation assembly 730, fixing the two recess members to each side of the skull in an ear hook manner. In some embodiments, the fixation assembly 730 may be a single-ear ear clip. The fixation assembly 730 may be individually connected to the recess member and the vibration housing 713 accommodated in the recess member and fixing the recess member to the side of the human skull. The structure of the fixation assembly 730 may be the same as or similar to the fixation assembly in other embodiments of the present disclosure (e.g., the fixation assembly 230) and will not be described herein.

Figure 8:
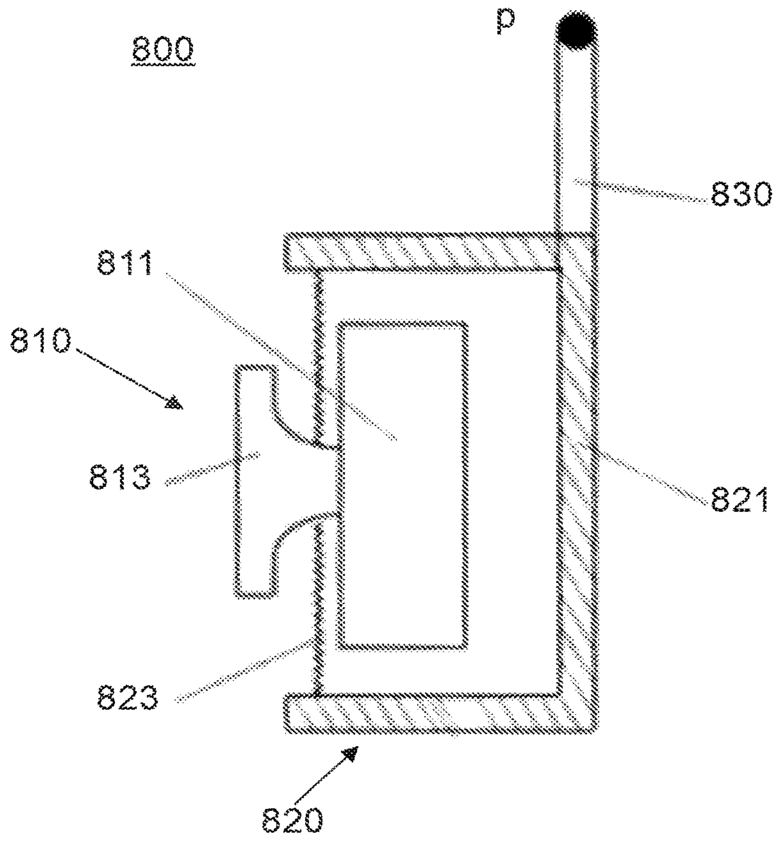
FIG. 8 is a schematic diagram illustrating a longitudinal cross-section of another bone conduction speaker according to some embodiments of the present disclosure.
Figure 9:
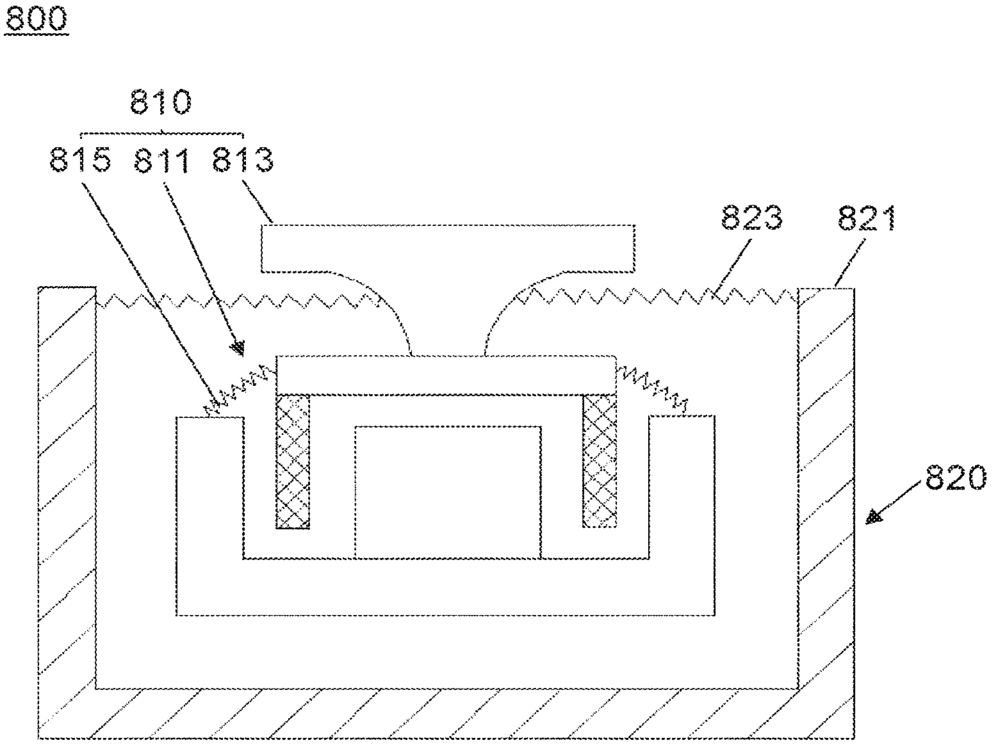
FIG. 9 is a schematic diagram illustrating a longitudinal cross-section of another bone conduction speaker according to some embodiments of the present disclosure.

FIG. 8 and FIG. 9 are schematic diagrams illustrating a longitudinal cross-section of another bone conduction speaker according to some embodiments of the present disclosure. As shown in FIGS. 8 and 9, the bone conduction speaker 800 may include a vibration assembly 810 and a resonance assembly 820. The vibration assembly 810 may include a vibration element 811, a vibration housing 813, and a second elastic element 815 (as shown in FIG. 9). The second elastic element 815 is used to elastically connect the vibration element 811 and the vibration housing 813.

The vibration housing 813 may be a separate panel or panel-like structure. Unlike the embodiment shown in FIG. 7, the vibration housing 813 does not define an accommodating space, and the vibration element and the second elastic element 815 are connected to the vibration housing 813. The mass element 821 may be a recess member, and the mass element 821 may define an accommodating space, and at least a portion of the vibration assembly 810 may be accommodated within the space formed by the mass element 821. The first elastic element 823 may connect the mass element 821 to the vibration housing 813.

The vibration element 811 may include a magnetic circuit assembly. A coil is provided on the vibration housing 813, and the magnetic circuit assembly is provided around outside the coil, and the second elastic element 815 connects the magnetic circuit assembly to the vibration housing 813.

The second elastic element 815 may be a transducer. In some embodiments, the transducer may be of an annular structure. As shown in FIG. 9, the annular structure of the transducer is provided around outside the vibration housing 813, and a circumference of the annular transducer is connected to the magnetic circuit assembly, and a middle of the annular transducer is connected to the vibration housing 813. When a mechanical vibration occurs by the action of the amperage force, the vibration housing 813 may transmit the vibration to the mass element 821 through the first elastic element 823, thus causing the mass element 821 to vibrate, and finally achieving the effect of weakening the vibration amplitude of the vibration assembly 810.

In some embodiments, the vibration element 811, the vibration housing 813, and the second elastic element 815 are the same as or similar to the vibration element 211, the vibration housing 213, and the second elastic element 215, respectively, in the bone conduction speaker 200, and the details of their construction are not repeated herein.

The basic concepts have been described above, apparently, in detail, as will be described above, and does not constitute limitations of the disclosure. Although there is no clear explanation here, those skilled in the art may make various modifications, improvements, and modifications of present disclosure. These types of modification, improvement, and corrections are recommended in present disclosure, so the modification, improvement, and the amendment remain in the spirit and scope of the exemplary embodiment of the present disclosure.

At the same time, present disclosure uses specific words to describe the embodiments of the present disclosure. As "one embodiment", "an embodiment", and/or "some embodiments" means a certain feature, structure, or characteristic of at least one embodiment of the present disclosure. Therefore, it is emphasized and should be appreciated that two or more references to "an embodiment" or "one embodiment" or "an alternative embodiment" in various parts of present disclosure are not necessarily all referring to the same embodiment. Further, certain features, structures, or features of one or more embodiments of the present disclosure may be combined.

Further, it can be understood by those skilled in the art that aspects of the present disclosure can be illustrated and described by a number of patentable categories or situations, including any new and useful combination of processes, machines, products, or substances or any new and useful improvement thereof. Accordingly, aspects of the present disclosure may be performed entirely by hardware, may be performed entirely by software (including firmware, resident software, microcode, etc.), or may be performed by a combination of hardware and software. All of the above hardware or software can be referred to as "data block", "module", "engine", "unit", "component" or "system". In addition, aspects of the present disclosure may be represented as a computer product located in one or more computer-readable media that includes a computer-readable program code.

Moreover, unless the claims are clearly stated, the sequence of the present disclosure, the use of the digital letters, or the use of other names is not configured to define the order of the present disclosure processes and methods. Although some examples of the disclosure currently considered useful in the present disclosure are discussed in the above disclosure, it should be understood that the details will only be described, and the appended claims are not limited to the disclosure embodiments. The requirements are designed to cover all modifications and equivalents combined with the substance and range of the present disclosure. For example, although the implementation of various components described above may be embodied in a hardware device, it may also be implemented as a software only scheme, e.g., an installation on an existing server or mobile device.

Similarly, it should be noted that in order to simplify the expression disclosed in the present disclosure and help the understanding of one or more embodiments, in the previous description of the embodiments of the present disclosure, a variety of features are sometimes combined into one embodiment, drawings or description thereof. However, this disclosure method does not mean that the characteristics required by the object of the present disclosure are more than the characteristics mentioned in the claims. Rather, claimed subject matter may lie in less than all features of a single foregoing disclosed embodiment.

In some embodiments, numbers expressing quantities of ingredients, properties, and so forth, configured to describe and claim certain embodiments of the application are to be understood as being modified in some instances by the term "about," "approximate," or "substantially". Unless otherwise stated, "approximately", "approximately" or "substantially" indicates that the number is allowed to vary by ±20%. Accordingly, in some embodiments, the numerical parameters used in the specification and claims are approximate values, and the approximate values may be changed according to characteristics required by individual embodiments. In some embodiments, the numerical parameters should be construed in light of the number of reported significant digits and by applying ordinary rounding techniques. Although the numerical domains and parameters used in the present disclosure are configured to confirm its range breadth, in the specific embodiment, the settings of such values are as accurately as possible within the feasible range.

Finally, it should be understood that the embodiments described herein are only configured to illustrate the principles of the embodiments of the present disclosure. Other deformations may also belong to the scope of the present disclosure. Thus, as an example, not limited, the alternative configuration of the present disclosure embodiment may be consistent with the teachings of the present disclosure. Accordingly, the embodiments of the present disclosure are not limited to the embodiments of the present disclosure clearly described and described.

What is claimed is:

1. A bone conduction speaker, comprising:

a vibration assembly including a vibration element and a vibration housing, the vibration element being used to convert an electrical signal into a mechanical vibration, the vibration housing being used to contact with a face of a user and to transmit the mechanical vibration to the user in a bone conduction manner to produce a sound; and a resonance assembly including a first elastic element and a mass element, the mass element being connected to the vibration assembly by the first elastic element, wherein the vibration assembly causes the resonance assembly to vibrate, the vibration of the resonance assembly weakening a vibration amplitude of the vibration housing; and a ratio of a mass of the mass element to a mass of the vibration housing is in a range from 0.04~1.25.

2. The bone conduction speaker of claim 1, wherein a ratio of a mass of the mass element to a mass of the vibration housing is in a range from 0.1~0.6.

3. The bone conduction speaker of claim 1, wherein the vibration assembly generates a first low frequency resonance peak at a first frequency and the resonance assembly generates a second low frequency resonance peak at a second frequency, a ratio of the second frequency to the first frequency being in a range from 0.5~2.

4. The bone conduction speaker of claim 3, wherein the vibration assembly generates the first low frequency resonance peak at the first frequency and the resonance assembly generates the second low frequency resonance peak at the second frequency, the ratio of the second frequency to the first frequency being in a range from 0.9~1.1.

5. The bone conduction speaker of claim 4, wherein the first frequency and the second frequency are both less than 500 Hz.

6. The bone conduction speaker of claim 5, wherein a vibration amplitude of the resonance assembly is greater than the vibration amplitude of the vibration housing in a frequency range less than the first frequency.

7. The bone conduction speaker of claim 1, wherein the vibration assembly further includes a second elastic element, wherein the vibration housing accommodates the vibration element and the second elastic element, the vibration element transmitting the mechanical vibration to the vibration housing through the second elastic element.

8. The bone conduction speaker of claim 7, wherein the second elastic element is a transducer, the transducer being fixedly connected to the vibration housing.

9. The bone conduction speaker of claim 1, wherein the first elastic element is fixedly connected to the vibration housing, the vibration housing transmitting the mechanical vibration to the mass element through the first elastic element.

10. The bone conduction speaker of claim 9, wherein the resonance assembly is accommodated within the vibration housing, the resonance assembly being connected to an inner wall of the vibration housing through the first elastic element.

11. The bone conduction speaker of claim 10, wherein the first elastic element includes a diaphragm, and the mass element includes a composite structure affixed to a surface of the diaphragm.

12. The bone conduction speaker of claim 11, wherein the composite structure includes a paper cone, an aluminum sheet or a copper sheet.

13. The bone conduction speaker of claim 10, wherein the vibration housing is disposed with at least one sound outlet hole, and a sound generated by the vibration of the resonance assembly is exported to an external world through the at least one sound outlet hole.

14. The bone conduction speaker of claim 13, wherein the at least one sound outlet hole is disposed on a side of the vibration housing back towards the face of the user.

15. The bone conduction speaker of claim 9, wherein the bone conduction speaker further includes a fixation assembly, the fixation assembly being used to maintain a stable contact of the bone conduction speaker with the user, the fixation assembly being fixedly connected to the vibration housing.

16. The bone conduction speaker of claim 15, wherein the mass element is a recess member, the vibration housing is at least partially accommodated within the recess member, the first elastic element is connected to the outer wall of the vibration housing and to an inner wall of the recess member, and an acoustic channel is formed between the inner wall of the recess member and the outer wall of the vibration housing.

17. The bone conduction speaker of claim 15, wherein the bone conduction speaker further includes a fixation assembly, the fixation assembly being used to maintain a contact of the bone conduction speaker with the face of the user, the fixation assembly being fixedly connected to the resonance assembly.

18. The bone conduction speaker of claim 9, wherein the resonance assembly is disposed outside of the vibration housing, the resonance assembly being connected to an outer wall of the vibration housing through the first elastic element.

19. The bone conduction speaker of claim 1, wherein the vibration housing is a panel-like structure, a coil is provided on the vibration housing, the vibration assembly includes a second elastic element, the vibration element includes a magnetic circuit assembly, the magnetic circuit assembly is provided around outside the coil, the magnetic circuit assembly is connected to the vibration housing by the second elastic element.

* * * * *